(12) United States Patent
Mikes et al.

(10) Patent No.: US 7,042,604 B2
(45) Date of Patent: May 9, 2006

(54) SELF-ALIGNING HOLOGRAPHIC OPTICAL SYSTEM AND RELATED METHODS

(75) Inventors: Thomas L. Mikes, Wellington, FL (US); Kenneth R. Wildnauer, Santa Rosa, CA (US); Rene Helbing, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 132 days.

(21) Appl. No.: 10/791,201

(22) Filed: Mar. 2, 2004

(65) Prior Publication Data

US 2005/0195454 A1 Sep. 8, 2005

(51) Int. Cl.
*G02B 5/32* (2006.01)
(52) U.S. Cl. .................... 359/15; 359/34; 385/24; 385/37
(58) Field of Classification Search ............... 359/1, 359/15, 34, 35; 385/24, 37; 398/84, 87
See application file for complete search history.

(56) References Cited

U.S. PATENT DOCUMENTS

| | | | | |
|---|---|---|---|---|
| 4,387,955 A | * | 6/1983 | Ludman et al. | ............... 385/37 |
| 4,824,193 A | * | 4/1989 | Maeda et al. | ................. 359/34 |
| 2004/0096150 A1 | * | 5/2004 | Laudo | ......................... 385/24 |

* cited by examiner

Primary Examiner—Leonidas Boutsikaris (57) ABSTRACT

Systems and methods for making a self-aligning optical system are provided, Briefly described, in architecture, one such system for making an optical system, among others, can be implemented as follows. The system includes a grating substrate supporting a holographically-formed diffraction grating and an array mount for defining relative locations of point sources of light. The array mount contains recording points that define locations of point sources of recording light used to illuminate the grating substrate during fabrication of the holographically-formed diffraction grating and use points that define locations of light apertures used in operation of the holographically-formed diffraction grating. Other systems and methods are also provided.

20 Claims, 6 Drawing Sheets

SELF-ALIGNING HOLOGRAPHIC OPTICAL SYSTEM AND RELATED METHODS

TECHNICAL FIELD

The present disclosure is generally related to optics, and, more particularly, is related to wavelength division multiplexers.

DESCRIPTION OF THE RELATED ART

A typical optical multiplexing/demultiplexing system couples different wavelengths of light from different sources into a single optical fiber. After transmission on the single fiber, another multiplexing/demultiplexing system separates the different wavelengths and provides them to different optical fibers. The typical multiplexing/demultiplexing system consists of a fiber array mount and a holographic diffraction grating. The holographic diffraction grating is produced through the effects of the interference of two coherent optical beams projected onto a photosensitive material from two point sources.

Figure 1:
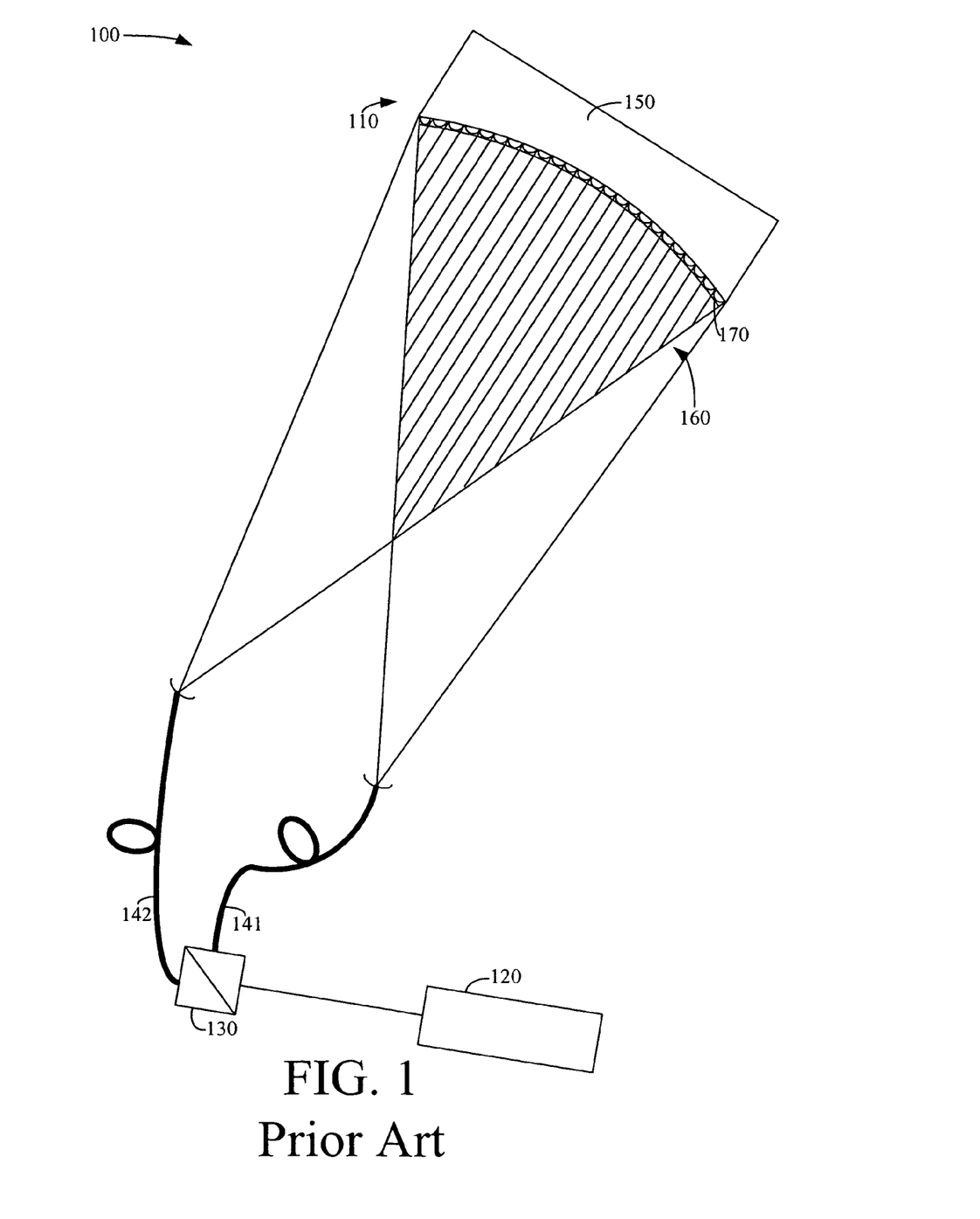
FIG. 1 is a block diagram illustrating a method for manufacturing a holographic diffraction grating of the prior art.

FIG. 1 illustrates a typical method 100 for manufacturing a holographic diffraction grating 110. First, a single coherent beam is generated by a suitable laser source 120. The single coherent beam is then split into two coherent beams by a beamsplitter 130. This directs the light into two separate optical fibers 141, 142. The output of the fibers is positioned with respect to the diffraction grating substrate 150 so that an interference pattern 160 is projected onto a photosensitive layer 170 that covers the substrate 150. Development of the photosensitive layer removes the exposed regions of the photosensitive layer and leaves the unexposed regions in place. This creates the surface relief pattern of the diffraction grating 110. In the case of a reflection grating, the photosensitive layer is overcoated by a reflecting mirror coating to enhance grating efficiency.

The diameters of the optical fibers 141, 142 used to record and manufacture the holographic diffraction grating 110 typically are on the order of 10 micrometers (μm) in diameter. The physical spacing between individual fibers 141, 142 typically is on the order of 25 to 50 millimeters (mm). Accordingly, the manufacturing of the holographic grating 110 involves precise alignment of the optical fibers 141, 142 in relation to the diffraction grating 110 and the laser beams.

Figure 2:
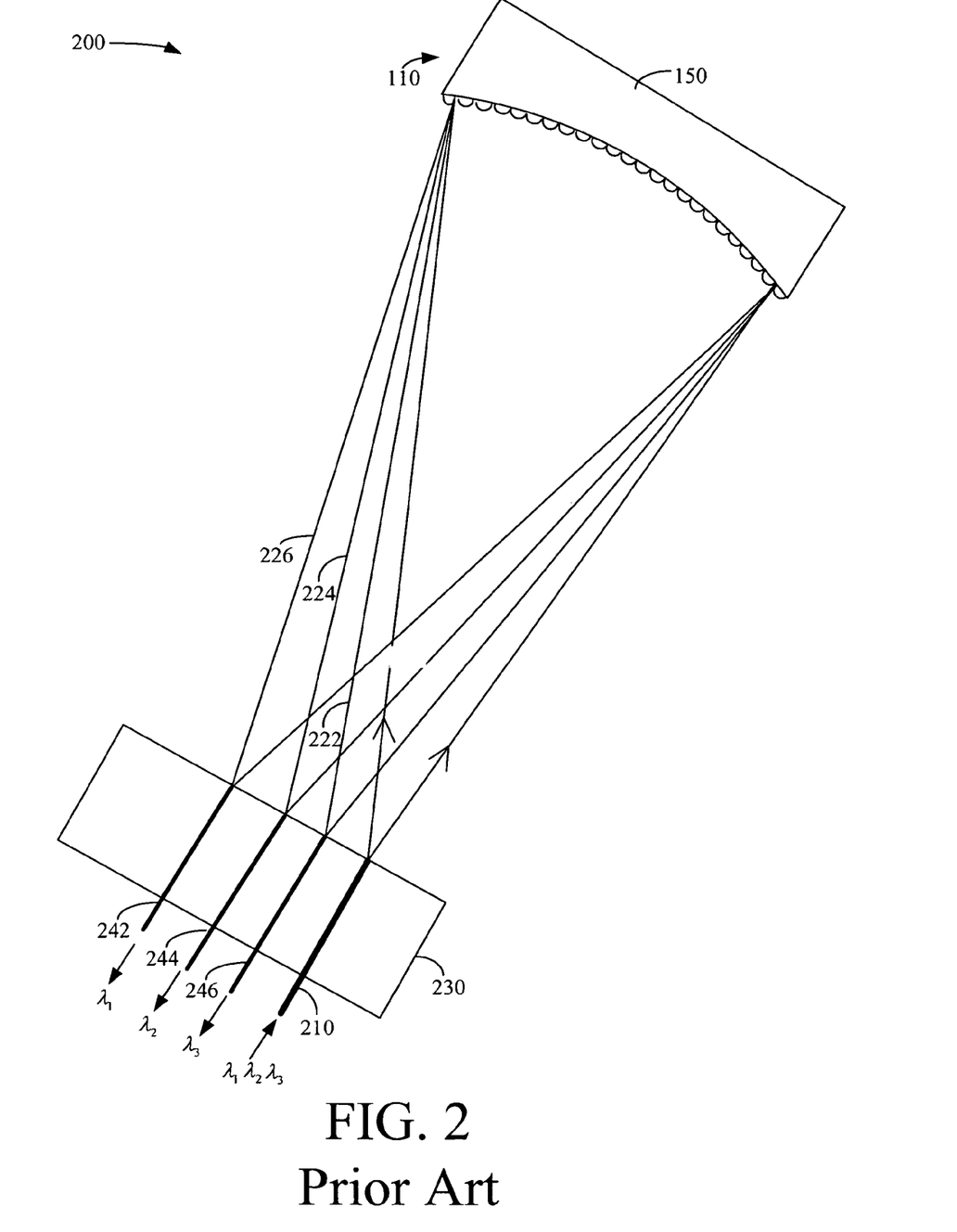
FIG. 2 is a block diagram illustrating a method for utilizing the prior art holographic grating of FIG. 1.

FIG. 2 depicts the utilization 200 of the holographic diffraction grating 110 produced via the method 100 illustrated in FIG. 1 in an optical multiplexing/demultiplexing system. First, a fiber array mount 230 secures the positioning of the ends of the input optical fiber 210 and output optical fibers 242–246. Then, the fiber array mount 230 and diffraction grating 10 are precisely positioned so that light (composed of optical signals of different wavelengths) emitted by the input optical fiber 210 illuminates the diffraction grating 110. The positioning is such that the optical signals of different wavelength 222, 224, 226 are separated via diffraction and imaged onto the fiber array mount 230. In this way, individual optical signals of different wavelengths 222, 224, 226 are focused into the output optical fibers 242, 244, 246. Since typical fiber cores are of the order of 10 μm in diameter and typical fiber arrays with cladding are as long as 25 mm in length, small misalignments of the parts in the multiplexer or demultiplexer can lead to significant optical loss in the optical system.

SUMMARY OF THE INVENTION

Systems and methods for making a self-aligning optical system are provided. Briefly described, in architecture, one such system for making a self-aligning optical system, among others, can be implemented as follows. The system comprises a grating substrate supporting a holographically-formed diffraction grating and an array mount for defining relative locations of point sources of light. The array mount comprises recording points that define locations of point sources of recording light used to illuminate the grating substrate during fabrication of the holographically-formed diffraction grating and use points that define locations of light apertures used in operation of the holographically-formed diffraction grating.

Briefly described, one embodiment of a method for making a self-aligning optical system comprises the steps of: determining locations of recording points from design parameters of a holographic diffraction grating; determining a positional relationship between locations of use points and the locations of the recording points; determining the locations of the use points based on the positional relationship; and fabricating a holographic diffraction grating using recording light emitted by point sources of light located at the recording points such that such that the light apertures at the use points are capable of optical communication via the holographic diffraction grating.

Other features and/or advantages will be or may become apparent to one with skill in the art upon examination of the following drawings and detailed description. It is intended that all such additional features and/or advantages be included within the description and be protected by the accompanying claims.

BRIEF DESCRIPTION OF THE DRAWINGS

The components in the drawings are not necessarily to scale. Moreover, in the drawings, like reference numerals designate corresponding parts throughout the several views.

DETAILED DESCRIPTION

The invention summarized above and defined by the enumerated claims may be better understood by referring to the following detailed description, which should be read in conjunction with the accompanying drawings.

Figure 3:
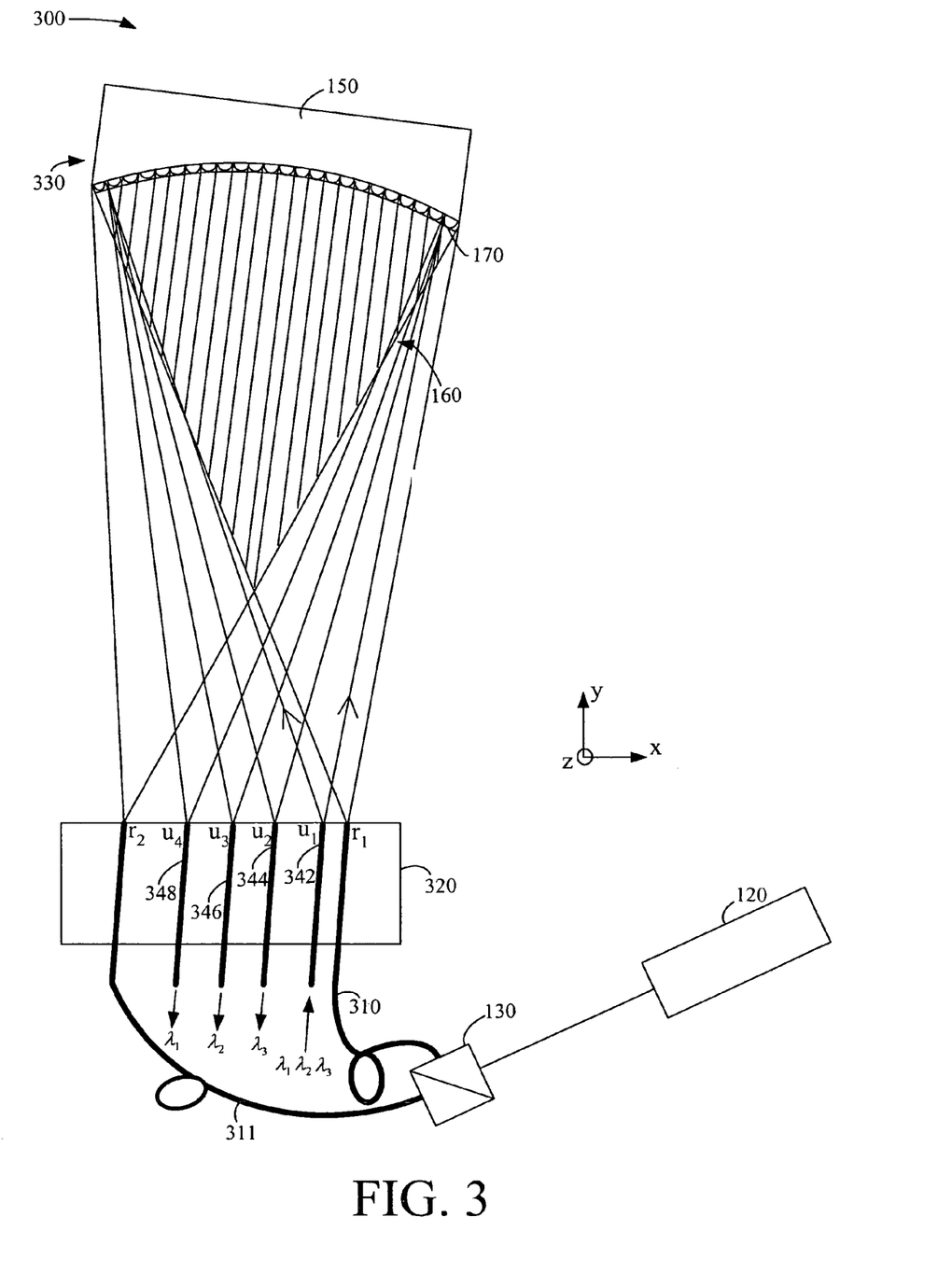
FIG. 3 is a block diagram illustrating an embodiment of a system for aligning an optical system employing a holographic diffraction grating.

Reference is now directed to FIG. 3, which provides an illustration of an improved system for manufacturing a multiplexing/demultiplexing system containing a holographic diffraction grating 330. In the example shown in FIG. 3, a fiber array mount 320 defines a pair of recording points $r_1$, $r_2$, one input use point $u_1$, and M output use points $u_2$–$u_4$.

The recording points $r_1$, $r_2$ are fixed locations for recording point sources of light, such as the ends of recording optical fibers 310, 311, and are arranged in a one-dimensional array disposed in the x-direction. The input use point $u_1$ is located in the fiber array mount 320 on same plane as the recording points $r_1$, $r_2$. The input use point $u_1$ is a fixed location for an input aperture, such as the end of an input optical fiber 342 or an entrance slit, among others.

The output use points $u_2$–$u_4$ are also located in the same plane as the recording points and the input use point. Each is offset from the input use point $u_1$ in the x-direction. The output use points $u_2$–$u_4$ are fixed locations for output apertures, such as ends of output optical fibers 344–348 or exit slits, among others. Locating each optical fiber 310, 311, 342–348 at its respective use point in the fiber array mount 320 before fabrication of the holographic diffraction grating 330 provides a self-aligning holographic optical system 300.

The system 300 also includes a coherent laser source 120 that generates a laser beam that is split by a beamsplitter 130. Alternatively, separate laser beams can be provided by an optical coupler (not shown). Each of the laser beams is directed into a respective one of the two recording optical fibers 310, 311. The positions of the recording optical fiber outputs are precisely determined to provide an interference pattern 160 on the photosensitive layer 170 of a grating substrate 150. Particularly, the end of the recording optical fibers 310, 311 are the point sources of light that create the interference pattern. Accordingly, the end of the recording optical fibers 310, 311 are positioned at the recording points $r_1$, $r_2$ in the fiber array mount 320.

The interference pattern 160 exposes the photosensitive layer 170. Typically, the photosensitive layer 170 is more sensitive to some wavelengths of light than others. Therefore, the wavelength of the light generated by the laser source 120 is in the sensitivity range of the type of photosensitive layer material used on the substrate 150.

Development of the photosensitive layer 170 removes the exposed regions of the photosensitive layer and leaves the unexposed regions in place. This creates a corrugated surface relief pattern that has sinusoidal ridges on the substrate 150. This corrugated surface provides a transmission holographic grating. The corrugated surface is typically coated with a thin metallic layer to produce a reflection holographic grating 330.

To determine the proper placement of the recording points $r_1$, $r_2$ within the fiber array mount 320 for developing the holographic diffraction grating 330, a commercially available ray-tracing program (such as the programs sold under the trademarks ZEMAX® or CODE V®, etc.) can be used. Given design parameters of the holographic diffraction grating 330, such as the wavelength of the recording light, the shape or curvature (if any) of the substrate 150, the diffraction order, and the desired groove frequency, the ray-tracing program calculates the location of the recording points $r_1$, $r_2$.

In operation of the holographic diffraction grating 330 as a wavelength filter, optical signals of different wavelengths are emitted from an input aperture (located at the input use point $u_1$), such as the end of an input optical fiber 142, towards the diffraction grating 330. The diffraction grating 330 separates the light into individual optical signals of different wavelengths and reflects the optical signals into respective output apertures (located at output use points $u_2$–$u_4$), such as the end of output optical fibers 344–348. The relative placement of the use points $u_1$–$u_4$ is theoretically related to the position in space of the diffraction grating 330, the curvature of the diffraction grating 330, the groove frequency, and the wavelengths of the light emitted by the input optical fiber 342. Accordingly, the locations of the use points $u_1$–$u_4$ are based on the same positional relationships as the recording points $r_1$, $r_2$. Therefore, the locations of the use points $u_1$–$u_4$ in the fiber array mount 320 are determined from the locations of the recording points $r_1$, $r_2$ and the wavelengths of the recording light and use light.

A point source of light is located at each recording point $r_1$, $r_2$. A small aperture in the fiber array mount 320 may act as a point source of light. With an aperture width at a few or more wavelengths of the recording light, the small aperture can also act as a spatial filter. However, the wavelength the aperture width can be smaller or larger than a few or more wavelengths of the recording light. In the example of FIG. 3, the small aperture is provided by the end of a recording optical fiber 310, 311. In alternative embodiments, the small aperture may be a pinhole.

At a recording light wavelength of approximately 400 nanometers (nm), the typical dimensions of the small aperture for exposing the wavelengths of light are approximately 2 to 10 µm. Optical fibers 310, 311 that have a single propagation mode at this wavelength (400 nm) will typically have a core diameter smaller than 4 µm and thus can be used as point sources without additional spatial filters.

The imaging properties of the diffraction grating 330 are determined by the shape of the concave substrate 150 and the spacing and curvature of the grooves in the diffraction grating 330. The spacing and curvature of the grooves on the diffraction grating 330 vary across the concave surface of the diffraction grating 330, as does the local incidence angle. Therefore, the directions of diffracted rays over the surface of the grating 330 is not parallel. Accordingly, the holographic diffraction grating 330 acts as both a dispersive element and a focusing element.

Once the holographic diffraction grating 330 is made using the recording points $r_1$, $r_2$, the positional relationships that determine the use points $u_1$–$u_4$ are also defined. Therefore, before fabrication of the grating 330, the recording points $r_1$, $r_2$ and the use points $u_1$–$u_4$ can be precisely determined, as shown in FIG. 3.

Relative alignment between optical fibers in an array can be achieved with submicrometer precision with relative ease. Therefore, the placements of the input optical fiber 342 and output optical fibers 344–348 can be defined relative to the placements of the recording optical fibers 310, 311, so that the input optical fiber 342 and output optical fibers 344 are self-aligned to the diffraction grating 330 that is formed from the recording optical fibers 310, 311. Therefore, the same fiber array mount 320 that is used to locate recording optical fibers 310, 311 during fabrication of the grating 330 can also be used to locate input optical fiber 342 and output optical fibers 344–348. After fabrication of the grating 330, the input optical fiber 342 and output optical fibers 344–348 are capable of optically communicating with each other via the holographic diffraction grating 330 without the need for re-alignment. This saves significant time and cost by removing a very critical and sensitive alignment step.

Figure 4:
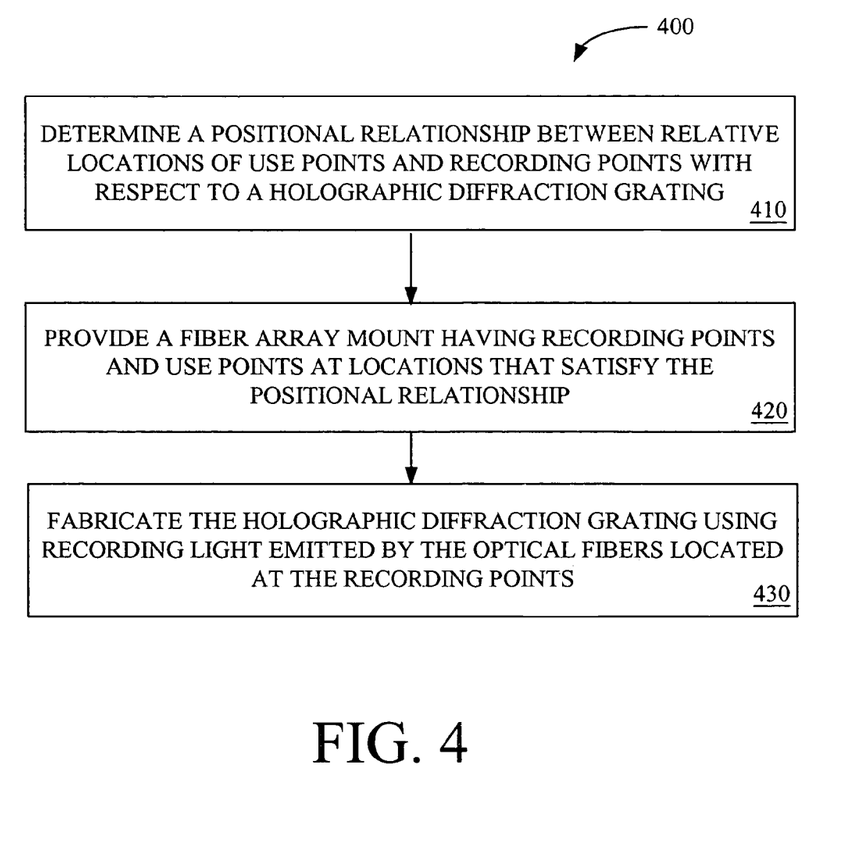
FIG. 4 is a flowchart illustrating an embodiment of a method for making the self-aligning optical system of FIG. 3.

FIG. 4 shows one embodiment 400 of a method for making a self-aligning optical system. First, a positional relationship is determined (410) between the relative locations of use points $u_1$–$u_4$ and recording points $r_1$, $r_2$ with respect to a holographic diffraction grating 330. For example, the locations of the recording points $r_1$, $r_2$ can be defined in space in relation to the grating substrate 150 of the holographic diffraction grating 330, and the locations of the use points $u_1$–$u_4$ can be defined in relation to the locations of the recording points $r_1$, $r_2$. Therefore, the positional relationship between the relative locations of the use points $u_1$–$u_4$ and locations of the recording points $r_1$, $r_2$ can be determined from the locations of the recording points $r_1$, $r_2$, design parameters of the holographic diffraction grating 330, and the wavelengths of use light utilized in operation of the diffraction grating 330. The design parameters include the wavelength of the recording light, the shape or curvature (if any) of the substrate 150, the diffraction order, and the desired groove frequency for the diffraction grating 330. After the positional relationship is ascertained, a fiber array mount 330 having the recording points $r_1$, $r_2$ and use points $u_1$–$u_4$ at locations that satisfy the positional relationship is provided (420).

As discussed previously, the recording points $r_1$, $r_2$ are the fixed locations for the ends of the recording optical fibers 310, 311 (or pinholes) and are defined in space in relation to the diffraction grating substrate 150. The ends of the recording optical fibers 310, 311 launch the coherent light that creates the interference pattern 160 on the substrate 150 covered with photosensitive material (e.g., photoresist). The use points $u_1$–$u_4$ are the locations of the ends of the input optical fiber 342 (or an entrance slit) and output optical fibers 344–348 (or exit slits) that are used in operation of the holographic diffraction grating 330. The recording points $r_1$, $r_2$ and the use points $u_1$–$u_4$ are at defined locations precisely within the fiber array mount 320.

In an embodiment, the recording points $r_1$, $r_2$ additionally serve as two of the use points $u_1$–$u_4$ in the fiber array mount 320. Because of this added constraint, some other design parameter might need to be allowed to vary, such as the wavelengths of recording and use light, the curvature of the diffraction grating 330, the groove frequency, or the diffraction order at which the diffraction grating 330 is used.

In the next step, using the recording light emitted from the recording optical fibers 310, 311 at the recording points $r_1$, $r_2$ in the fiber array mount 320, the holographic diffraction grating 330 is fabricated (430). Fabricating the holographic diffraction grating 330 using recording light emitted by the recording optical fibers 310, 311 self aligns the input and output optical fibers 342–348 at the respective use points $u_1$–$u_4$ in the fiber array mount 320 with the holographic diffraction grating 330 so that the input optical fiber 342 at the input use point $u_1$ can optically communicate with output optical fibers 344–348 at the output use points $u_2$–$u_4$ via the holographic diffraction grating 330. Typically, after fabrication of the holographic diffraction grating 330, the recording optical fibers 310, 311 may be cut and removed, since the recording optical fibers 310, 311 are not used after the diffraction grating 330 has been fabricated. However, in some embodiments, the recording optical fibers 310, 311 additionally serve as input and output optical fibers 342–348 and thus are not removed.

Figure 5:
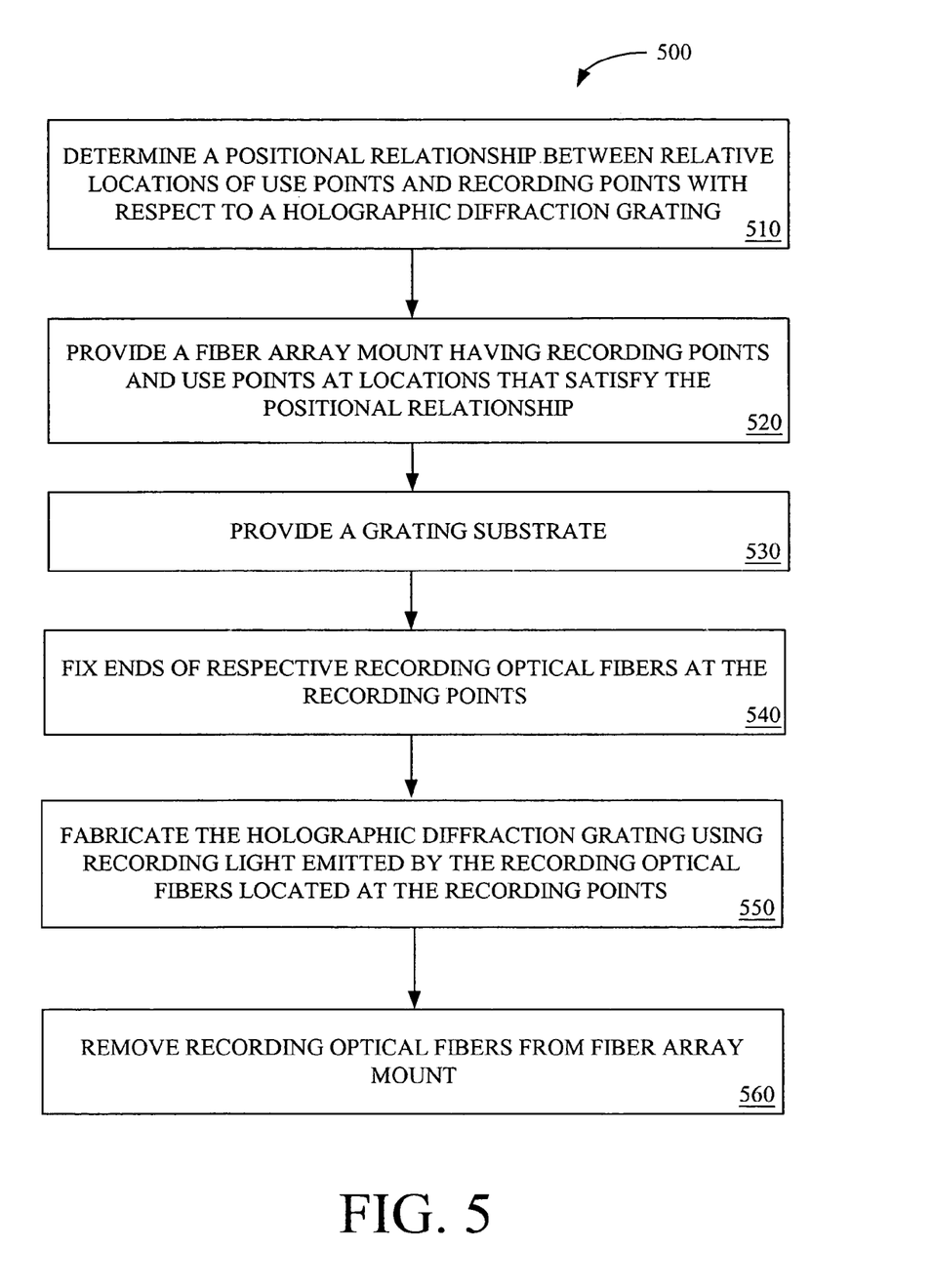
FIG. 5 is a flowchart diagram illustrating an embodiment of a method for making the self-aligning optical system of FIG. 3.

Correspondingly, FIG. 5 shows one exemplary embodiment 500 of a method for making a self-aligning optical system. First, a positional relationship is determined (510) between the relative locations of use points $U_1$–$u_4$ and recording points $r_1$, $r_2$ with respect to a holographic diffraction grating 330. After the positional relationship is determined, a fiber array mount 330 having the recording points $r_1$, $r_2$ and use points $u_1$–$u_4$ at locations that satisfy the positional relationship is provided (520).

Next, a grating substrate 150 is provided (530), and the ends of the recording optical fibers 310, 311 are fixed (540) at the predetermined recording points $r_1$, $r_2$ with respect to the grating substrate 150. Using the recording light emitted from the recording optical fibers 310, 311 at the recording points $r_1$, $r_2$ in the fiber array mount 320, the holographic diffraction grating 330 is fabricated (550). The recording optical fibers 310, 311 are then removed (560) from the fiber array mount 320.

Figure 6:
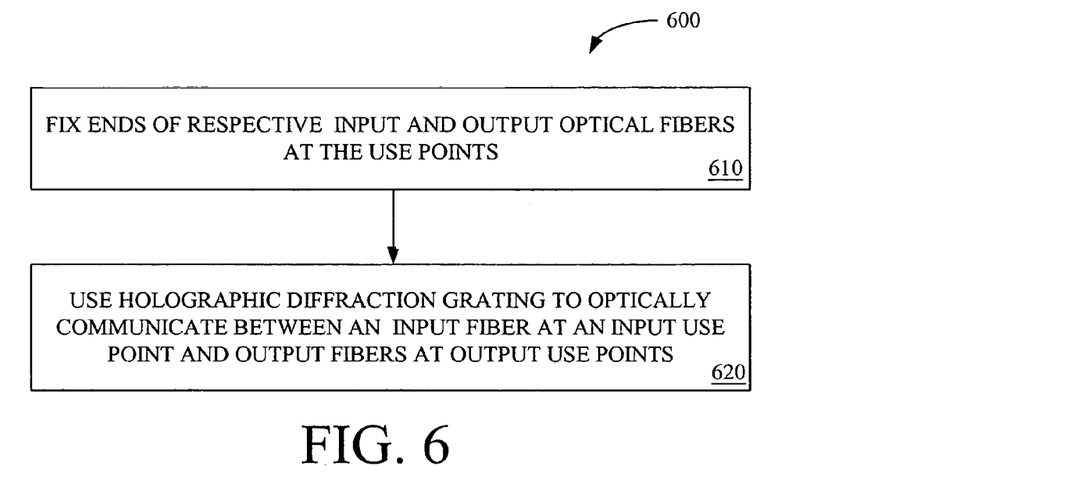
FIG. 6 is a flowchart diagram illustrating an embodiment of a method for using the self-aligning optical system of FIG. 3.

One embodiment 600 of a method for using a self-aligning optical system will be described next. After fabrication of the holographic diffraction grating, the ends of input optical fiber 342 and output optical fibers 344–348 are fixed (610) at the predetermined use points $u_1$–$u_4$ with respect to the recording points $r_1$, $r_2$, as shown in FIG. 6. Accordingly, the fiber array mount 320 is employed to secure the positioning of the input and output optical fibers at the predetermined use points.

Fabricating the holographic diffraction grating 330 using recording light emitted by the recording optical fibers 310, 311, self aligns the input and output optical fibers 342–348 at the respective use points $u_1$–$u_4$ in the fiber array mount 320 with the holographic diffraction grating 330 so that the input optical fiber 342 at the input use point $u_1$ can optically communicate (620) with output optical fibers 344–348 at the output use points $u_2$–$u_4$ via the holographic diffraction grating 330.

Figure 7:
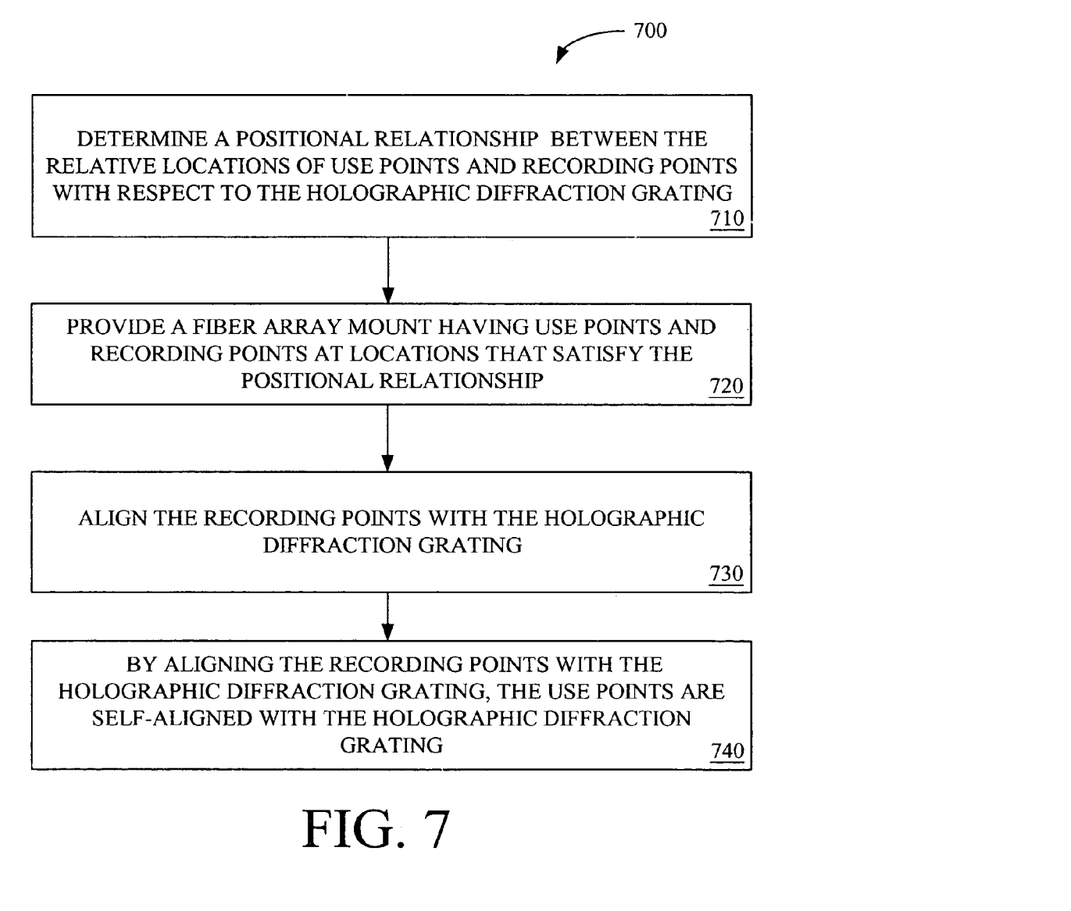
FIG. 7 is a flowchart illustrating an embodiment of a method for positioning the self-aligning optical system of FIG. 3.

One embodiment 700 of a method according to the invention for aligning the positioning of optical fibers 342–348 in a fiber array mount 320 that is used in operation of the holographic diffraction grating 330 but was not used to fabricate the holographic diffraction grating 330 will now be described with reference to FIG. 7. First, a positional relationship is determined (710) between the relative locations of use points $u_1$–$u_4$ and recording points $r_1$, $r_2$ with respect to the holographic diffraction grating 330. Then, a fiber array mount 320 is provided (720) that has use points $u_1$–$u_4$ and recording points $r_1$, $r_2$ at locations that satisfy the positional relationship. Next, the recording points are aligned (730) with the holographic diffraction grating 330.

To align the recording points, a laser of the same wavelength as the recording laser can be used to illuminate the holographic diffraction grating 330 through the ends of recording optical fibers 310, 311 at the recording points in the fiber array mount 320. When the diffraction grating 330 is in the same position relative to the ends of recording optical fibers 310, 311 that it was during its exposure process, the interference pattern on the grating 330 will disappear. Note, this is very similar to the pattern one gets in an interferometer. Therefore, once the alignment between the recording optical fibers 310, 311 and the diffraction grating 330 produces less than one interference fringe, the ends of recording optical fibers 310, 311 at the recording points $r_1$, $r_2$ are properly positioned, and are aligned to the diffraction grating 330.

The proper placement of the ends of recording optical fibers 310, 311 at the recording points $r_1$, $r_2$ with respect to the holographic diffraction grating means that the ends of use optical fibers 342–248 at the use points $u_1$–$u_4$ are also properly aligned with the holographic diffraction grating 330. Therefore, by aligning the recording points with the holographic diffraction grating 330, the use points are self-aligned (740) with the holographic diffraction grating 330. Advantageously, the alignment of optical fibers 342–248 at the use points $u_1$–$u_4$ can be performed at the same time as the alignment of the recording optical fibers. In this way, sophisticated instrumentation does not have to be used to separately align optical fibers at the use points $u_1$–$u_4$ with respect to the holographic diffraction grating 330.

By positioning the input optical fiber 342 and output optical fibers 344–348 at the respective use points $u_1$, $u_2$–$u_4$ whose locations are accurately defined relative to those of the recording points, the optical system 300 is automatically aligned. Therefore, this reduces the cost and complexity of manufacture a multiplexing/demultiplexing system containing a holographic diffraction grating 330. Typically, a multiplexing/demultiplexing system is designed with identical input and output optical fibers. Accordingly, when light propagation is reversed in the system 300, the demultiplexing system becomes a multiplexing system.

It should be emphasized that the above-described embodiments, particularly, any "preferred" embodiments, are merely possible examples of implementations, merely set forth for a clear understanding of the principles of the invention. Many variations and modifications may be made to the above-described embodiments without departing substantially from the invention defined by the claims. For example, optical pinholes may be used in lieu of optical fibers to form the interference pattern. Also, a holographic grating may be employed as a transmission grating. All such modifications and variations are intended to be included herein within the scope of this disclosure and the present invention and protected by the following claims.

We claim:

1. A self-aligning holographic optical system, comprising:
   a grating substrate supporting a holographically-formed diffraction grating; and
   an array mount for defining relative locations of point sources of light, the array mount comprising:
      recording points defining locations of point sources of recording light used to illuminate the grating substrate during fabrication of the holographically-formed diffraction grating;
      an input use point defined during fabrication of the holographically-formed diffraction grating; and
      an output use point defined during fabrication of the holographically-formed diffraction grating; wherein the input and output use points define locations of light apertures used in operation of the holographically-formed diffraction grating.

2. The system of claim 1, additionally comprising:
   optical fibers located at the recording points.

3. The system of claim 1, additionally comprising:
   pinholes located at the recording points.

4. The system of claim 1, wherein the apertures comprise the ends of optical fibers.

5. The system of claim 1, wherein the apertures comprise an entrance slit and at least one exit slit in the array mount.

6. The system of claim 1, wherein the use points comprise locations that are the same as the recording points.

7. The system of claim 1, additionally comprising:
   a thin metallic layer coating the surface of the holographically-formed diffraction grating.

8. A method of making a self-aligning optical system, the method comprising:
   determining a positional relationship between locations of use points and locations of recording points when fabricating a holographic diffraction grating;
   providing an array mount having recording points and use points at the locations that satisfy the positional relationship;
   using the array mount to fabricate the holographic diffraction grating by illuminating a photosensitive layer with recording light emitted by point sources of light located at the recording points.

9. The method of claim 8, further comprising:
   determining the locations of the recording points from design parameters of the holographic diffraction grating.

10. The method of claim 8, further comprising:
    locating optical fibers at the recording points for emitting the recording light.

11. The method of claim 8, further comprising:
    locating pinholes at the recording points for emitting the recording light.

12. The method of claim 8, further comprising:
    locating ends of optical fibers at the use points to optically communicate via the holographic diffraction grating.

13. The method of claim 8, wherein at least one of the use points has a same location as at least one of the recording points.

14. A method of aligning an optical system with a holographically-formed diffraction grating, comprising:
    providing an array mount with use points and recording points at locations satisfying a positional relationship; and
    using the recording points in the array mount for aligning the array mount with the holographically-formed diffraction grating whereby the use points in the array mount are automatically aligned with the holographically-formed diffraction grating.

15. The method of claim 14, the method further comprising:
    determining the locations of the recording points from design parameters of the holographic diffraction grating.

16. The method of claim 14, wherein the step of using the recording points in the array mount for aligning the array mount with the holographically-formed diffraction grating comprises:
    producing an interference fringe pattern by illuminating the holographically-formed diffraction grating with recording light at the recording points; and positioning the recording points to produce an interference pattern with less than one interference fringe.

17. An array mount comprising:
    a first fixed location from which a recording light is directed upon a grating substrate for fabricating a holographic diffraction grating; and
    a second fixed location defined when fabricating the holographic diffraction grating, the second fixed location configured to locate an optical fiber for directing an optical signal upon the holographic diffraction grating for a wavelength diffraction of the optical signal.

18. The array mount of claim 17, wherein the wavelength diffraction comprises one of a) a wavelength multiplexing, b) a wavelength demultiplexing and c) a wavelength filtering.

19. The array mount of claim 17, wherein the optical signal comprises a plurality of wavelengths and the holographic diffraction grating is operable to demultiplex the plurality of wavelengths.

20. The array mount of claim 17, wherein the first fixed location is alternatively used to direct an alignment light upon the holographic diffraction grating for aligning the second fixed location with reference to the holographic diffraction grating.

* * * * *

UNITED STATES PATENT AND TRADEMARK OFFICE
CERTIFICATE OF CORRECTION

PATENT NO. : 7,042,604 B2
APPLICATION NO. : 10/791201
DATED : May 9, 2006
INVENTOR(S) : Mikes et al.

It is certified that error appears in the above-identified patent and that said Letters Patent is hereby corrected as shown below:

On Title page (item (56),) under "U.S. Patent Documents", in column 2, line 3, delete "385/24" and insert - - 385/024 - -, therefor.

On Title page (item (57),) under "Abstract", in column 2, line 2, delete "provided," and insert - - provided. - -, therefor.

Signed and Sealed this

Fifth day of September, 2006

JON W. DUDAS
*Director of the United States Patent and Trademark Office*